July 31, 1928.
B. T. ANDREN
1,678,930
SPRING HANGER AND GUSSET FOR AUTOMOBILE FRAMES
Filed June 28, 1926  2 Sheets-Sheet 1
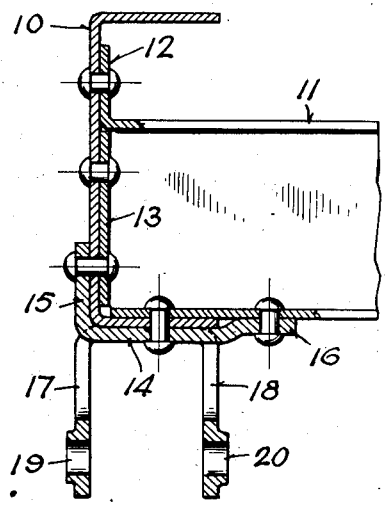
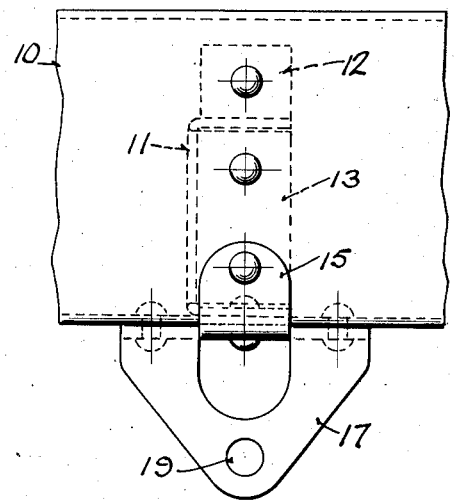
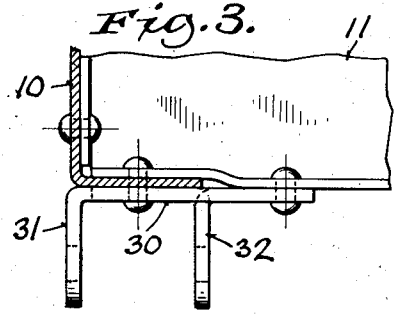
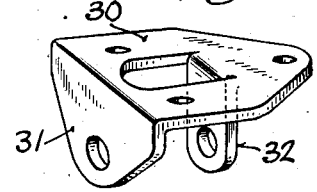
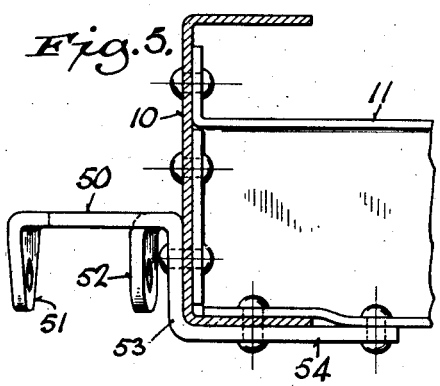
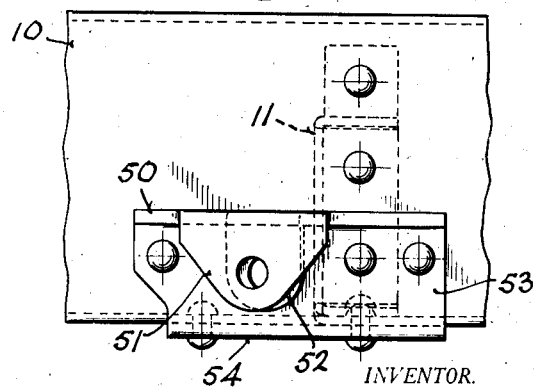
WITNESS:
Fred Palm
DEL.
INVENTOR.
BIRGER T. ANDREN
BY
Erwin, Wheeler & Leaoland
ATTORNEYS.

July 31, 1928.
B. T. ANDREN
1,678,930
SPRING HANGER AND GUSSET FOR AUTOMOBILE FRAMES
Filed June 28, 1926     2 Sheets-Sheet 2
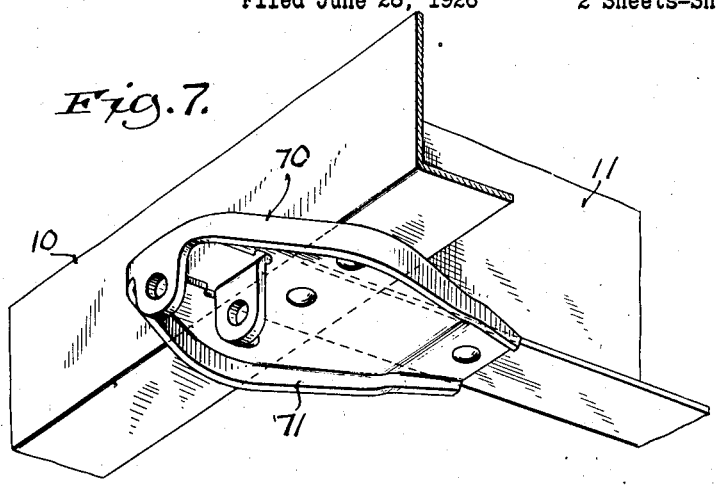
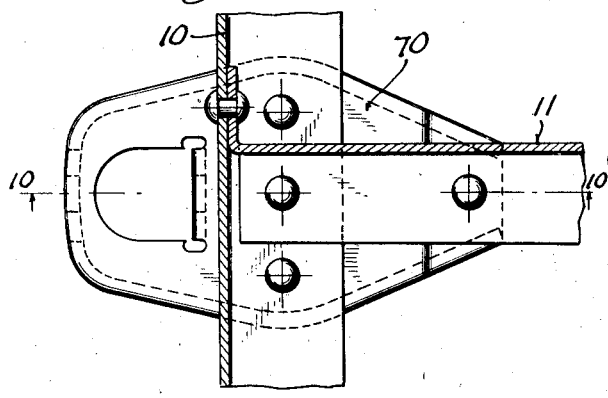
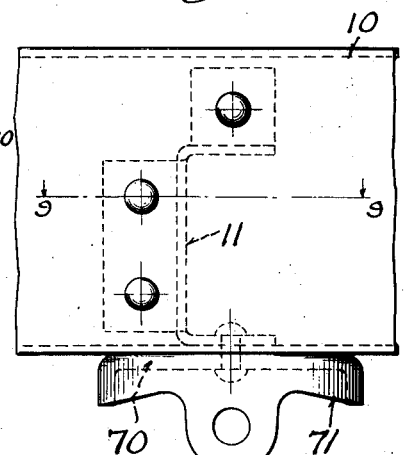
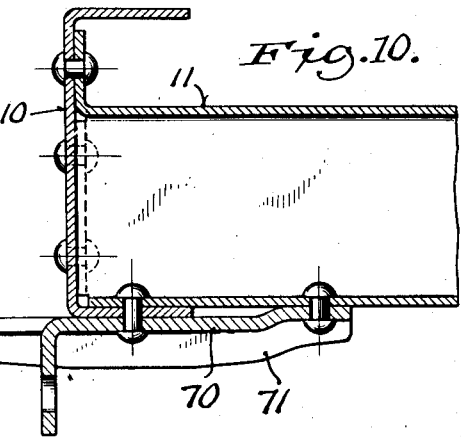
INVENTOR.
BIRGER T. ANDREN
BY
ATTORNEYS.
WITNESS:

Patented July 31, 1928.

1,678,930

UNITED STATES PATENT OFFICE.

BIRGER TORVALD ANDREN, OF MILWAUKEE, WISCONSIN, ASSIGNOR TO A. O. SMITH CORPORATION, OF MILWAUKEE, WISCONSIN, A CORPORATION OF NEW YORK.

SPRING HANGER AND GUSSET FOR AUTOMOBILE FRAMES.

Application filed June 28, 1926. Serial No. 119,014.

My invention relates to an improved construction of spring hanger and gusset for an automobile frame, whereby the said elements are produced integrally instead of separately as is usual in manufactures of this class. The separate production of these elements necessitates additional cost in their manufacture as well as additional work in their assembly, and I have found that economy in the cost of production can be effected in their combination in one structure, with a saving of labor at the time that the elements are assembled and incorporated in the frame of which they form a permanent part.

The gussets are used to secure the cross bars to the side bars of the frame, and their function is to brace the frame against racking, due to bad road conditions or uneven loads. By extending them laterally at both sides of the cross bar, and in the direction of the length of the side bars, the efficiency of the construction is increased.

The invention resides in a sheet metal stamping properly shaped by the dies of a drawing press so as to constitute a unitary spring hanger and gusset. The article is capable of considerable variation in its structural features, but in all of such varied constructions the dominant idea of the invention is present.

In the drawings attached hereto, and forming a part of this specification, several forms of my invention are illustrated. These will now be described in detail, and the novelty of the invention will be pointed out in the appended claims.

In the accompanying drawings:

Figure 1 is a vertical sectional view, transversely of one of the cross bars, showing the construction of one form of my invention, and the manner in which it is used to connect the ends of a cross bar to the side bars of an automobile frame, and Fig. 2 is a view in elevation of the same from the left of Fig. 1.

Fig. 3 is a view in the plane of Fig. 1, showing the invention slightly modified, and Fig. 4 is a perspective view of the same.

Fig. 5 is a view in the plane of Fig. 1, and Fig. 6 is a view in elevation from the left of Fig. 5, showing a further modification.

Fig. 7 is a perspective view from the underside of the frame showing another modification, and Fig. 8 is a view in elevation of the same from the left of Fig. 7.

Fig. 9 is a horizontal sectional view of the modification shown in Figs. 7 and 8, on the line 9—9, Fig. 8, and Fig. 10 is a vertical sectional view of the same on the line 10—10, Fig. 9, looking in the direction of the arrows.

The invention has been developed from an engineering standpoint with particular consideration of the functions which it is designed to subserve, so that the same may be produced economically and with no waste other than a minimum amount of material. In all of its forms, the features of the improved spring hanger and gusset are produced by turning from the plane of the metal plate out of which the article is formed, certain portions thereof so as to stand perpendicularly to the plate. In some instances, such perpendicular portions are formed by bending the end of the plate, and in other instances by punching out and positioning a tongue in parallelism with the bent end. In all of the constructions, the plate is provided with a lateral width over that required in forming the spring hanger and in excess of the thickness of the cross bar, so as to endow the gusset portion with the necessary resistance to strains, and so provide the frame with the required degree of stability.

In Fig. 1, the numeral 10 indicates the side bar and the numeral 11 the cross bar of an automobile frame, the cross bar being lapped at its ends as at 12 and 13, to permit connection to the side bar. A gusset and spring hanger 14 is formed from a comparatively thick metal plate from which tongues 15 and 16 are punched. The tongue 15 is upturned so as to lie against or stand vertically with relation to the side bar, while the tongue 16, offset vertically to compensate for the lower flange of the side bar, is caused to come into contact with the underside of the lower flange of the cross bar. The end portions of the plate are downturned to form the parallel lugs 17 and 18 which form the spring hanger. It is better to provide the lugs 17 and 18 with enlargements 19 and 20, which form bosses for the reception of the connecting pin of the spring hanger, in all forms of the invention, as well as that illustrated in Figs. 1 and 2. Viewing Fig. 2, it will be seen that the gusset portion is widened laterally of the cross bar so as to extend from both sides thereof, and constitute the gusset as a strong brace. The parts when formed and assembled as in Figs. 1 and 2 are united by rivets, or otherwise, so as to form a substantial, permanent structure.

In Figs. 3 and 4, the spring hanger is produced by downturning one end of the plate 30 so as to form a lug 31 and by punching out from the top of the plate a tongue which is downturned to form the companion lug 32, to stand parallel with the lug 31.

In Figs. 5 and 6, the spring hanger is shown as offset from the side bar, so as to meet the requirements of the spring connections in certain types of frames. The plate 50 is provided with downturned lugs 51 and 52, forming the spring hanger, produced in a manner quite similar to that last described. The plate 50, however, has greater length and is downturned as at 53 and returned as at 54, so as to embrace the lower outer angle of the side bar, and is extended beyond the lower flange of the side bar to a point which will permit attachment to the cross bar. The downturned lug 52 is produced by punching the tongue of the outwardly extending portion of the plate 50, as shown by dotted lines in Fig. 5.

Figs. 7 to 10 show a construction in which the spring hanger feature, formed in the manner last described, and the gusset, are reinforced by downturning the edges of the plate 70, so as to form an integral depending flange or skirt 71, extending almost entirely around the spring hanger and gusset. This reinforcement enables the spring hanger to better resist the downward pressures upon the loaded vehicle, and the strains encountered in uneven road conditions.

The spread of the web of the gusset laterally at both sides of the cross bar as described, enables strong bracing to be performed, by reason of the distance apart of the rivets which connect the gusset to the side bar at widely separated points on the opposite sides of the cross bar. The longitudinal line on which the said rivets are placed forms the base of a triangle, the apex of which is that point on the inner end of the gusset plate where a rivet connects the gusset and the cross bar.

Having thus described my invention, what I claim and desire to secure by Letters Patent of the United States, is:

1. A spring hanger formed integrally with a laterally widened gusset plate, the said spring hanger being composed of two portions of the gusset plate extending perpendicularly to the plane of the plate and parallel to each other.

2. A spring hanger formed integrally with a laterally widened gusset plate, the said spring hanger being composed of two portions of the gusset plate extending perpendicularly to the plane of the plate and parallel to each other, and with the marginal edge of the plate turned from the plane thereof to maintain the spring hanger against deflection.

3. In an automobile frame, a side bar and a cross bar, in combination with a spring hanger formed integrally with a widened gusset plate, the said spring hanger being composed of two portions of the gusset plate extending perpendicularly to the plane of the plate and parallel to each other, the widened portions of the gusset plate being connected to the side bar and another portion of the gusset plate being connected to the cross bar.

4. In an automobile frame, a side bar and a cross bar, in combination with a spring hanger formed integrally with a widened gusset plate, the said spring hanger being composed of two portions of the gusset plate extending perpendicularly to the plane of the plate and parallel to each other, with the marginal edge of the plate turned from the plane thereof to maintain the spring hanger against deflection, the widened portions of the gusset plate being connected to the side bar and another portion of the gusset plate being connected to the cross bar.

5. In an automobile frame, a side bar and a cross bar, in combination with a depending spring hanger formed integrally with a laterally widened gusset plate, the widened parts of the gusset plate being connected to the side bar at points on opposite sides of the cross bar and to the cross bar at a point remote from the connections with the side bar.

6. In an automobile frame, a side bar and a cross bar, in combination with a depending spring hanger formed integrally with a laterally widened gusset plate, the marginal edge of the plate being turned from the plane thereof to maintain the spring hanger against deflection, the widened parts of the gusset plate being connected to the side bar at points on opposite sides of the cross bar and to the cross bar at a point remote from the connections with the side bar.

7. In an automobile frame, a side bar and a cross bar, in combination with a depending spring hanger formed integrally with a laterally widened gusset plate, the widened parts of the gusset plate being connected to the side bar at separated points and to the cross bar at a point remote from the connections with the side bar.

In testimony whereof, I have signed my name at Milwaukee, this 11th day of June, 1926.

B. T. ANDREN.